(12) United States Patent
Black et al.

(10) Patent No.: US 7,682,591 B2
(45) Date of Patent: Mar. 23, 2010

(54) EMBEDDED NANOPARTICLE FILMS AND METHOD FOR THEIR FORMATION IN SELECTIVE AREAS ON A SURFACE

(75) Inventors: Charles T. Black, New York, NY (US); Christopher B. Murray, Ossining, NY (US); Robert L. Sandstrom, Chestnut Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/197,688

(22) Filed: Aug. 25, 2008

(65) Prior Publication Data

US 2009/0053129 A1 Feb. 26, 2009

Related U.S. Application Data

(63) Continuation of application No. 11/400,390, filed on Apr. 10, 2006.

(51) Int. Cl.
*D01F 9/127* (2006.01)
(52) U.S. Cl. ................. 423/447.3; 423/445 B
(58) Field of Classification Search ........... 423/447.3; 427/181, 202, 356
See application file for complete search history.

(56) References Cited

U.S. PATENT DOCUMENTS

| | | | | |
|---|---|---|---|---|
| 5,283,927 A * | 2/1994 | Gibbon et al. | ........... | 15/250.48 |
| 5,691,054 A | 11/1997 | Tennent et al. | ........... | 428/359 |
| 6,989,324 B2 | 1/2006 | Lee et al. | ........... | 438/610 |
| 7,166,325 B2 * | 1/2007 | Dai et al. | ........... | 427/249.1 |
| 7,282,191 B1 * | 10/2007 | Choi et al. | ........... | 423/447.3 |
| 2005/0089467 A1 | 4/2005 | Grill et al. | | |
| 2005/0196606 A1 * | 9/2005 | Ihara et al. | ........... | 428/323 |
| 2005/0244327 A9 | 11/2005 | Smalley et al. | | |

FOREIGN PATENT DOCUMENTS

CN  1434461 A  8/2003

OTHER PUBLICATIONS

W.Z. Li et al., Large-Scale Synthesis of Aligned Carbon Nanotubes, Dec. 1996, Science, vol. 274, p. 1701-1703.*
Y. Li et al., Growth of Single-Walled Carbon Nanotubes from Discrete Catalytic Nanoparticles of Various Sizes, 2001, Journal of Physical Chemistry B, vol. 105, p. 11424-11431.*
J. Li et al., Highly-ordered carbon nanotube arrays for electronics applications, Jul. 1999, Applied Physics Letters, vol. 75, num. 3, p. 367-369.*
Yin et. al. 2001. "Template-Assisted Self-Assembly: A Practical Route to Complex Aggregates of Monodispersed Colloids with Well-Defined Sizes, Shapes and Structures".

* cited by examiner

*Primary Examiner*—Jerry Lorengo
*Assistant Examiner*—Jared Wood
(74) *Attorney, Agent, or Firm*—Connolly Bove Lodge & Hutz LLP; Daniel P. Morris

(57) ABSTRACT

The invention is directed to a method of positioning nanoparticles on a patterned substrate. The method comprises providing a patterned substrate with selectively positioned recesses, and applying a solution or suspension of nanoparticles to the patterned substrate to form a wetted substrate. A wiper member is dragged across the surface of the wetted substrate to remove a portion of the applied nanoparticles from the wetted substrate, and leaving a substantial number of the remaining portion of the applied nanoparticles disposed in the selectively positioned recesses of the substrate. The invention is also directed to a method of making carbon nanotubes from the positioned nanoparticles.

12 Claims, 7 Drawing Sheets

_US 7,682,591 B2_

EMBEDDED NANOPARTICLE FILMS AND METHOD FOR THEIR FORMATION IN SELECTIVE AREAS ON A SURFACE

This application is a Continuation of co-pending application Ser. No. 11/400,390, filed on Apr. 10, 2006, and for which priority is claimed under 35 U.S.C. §120, the entire contents of which are hereby incorporated by reference.

FIELD OF THE INVENTION

The invention is directed a method for positioning nanoparticles on a patterned substrate, and the use of the positioned nanoparticles to make one-dimensional materials.

BACKGROUND OF THE INVENTION

Deposition of uniformly-thick films of insulating, semiconducting, and conducting materials is of paramount importance to the microelectronics industry. As the lateral feature size of circuit elements continues to shrink (in order to achieve improved circuit performance), the uniformity tolerances on film thicknesses also scales down proportionally. Conventional film deposition methods such as physical vapor deposition, chemical vapor deposition, and atomic layer deposition can achieve uniform thicknesses (at the precision of single atomic layers) over extremely large areas, however such systems are costly both to purchase and to maintain. Also, there are other lower-performance types of applications for microelectronics where it would be desirable to deposit uniform layers of materials without requiring highly specialized (and expensive) deposition systems.

Chemically-synthesized nanoparticles provide a low-cost alternative route to the production of materials that are highly-uniform in size and composition. High-temperature solution-phase synthesis is one method by which highly-uniform materials can be produced. Methods exist for production of a variety of metals, insulators, and semiconductors. Briefly stated, these methods produce solutions of inorganic nanoparticles with mean diameters tunable through the range of 1 nm to 20 nm and with mean diameter standard deviations on the order of 5%. These nanoparticles are individually coated with organic surfactants that can be tailored to be in the range of 1-4 nm long. The surfactant prevents the nanoparticles from aggregating in solution. A schematic of a chemically-synthesized nanoparticle is shown in FIG. 1(a).

Uniformly-sized nanoparticles can be made to organize themselves into a crystal when deposited from solution onto a substrate. Because of their uniform size, spherically-shaped nanoparticles will pack into hexagonal-close-packed (HCP) arrangements as shown schematically in FIG. 1(b). This process is often referred to as self-assembly. Nanoparticles of other shapes will pack into different crystal arrangements. For example, cubic shaped nanoparticles will pack into a cubic lattice. One advantage of this type of self assembly is that, because of the uniform diameter of the nanoparticles, the resulting film has a very uniform thickness. In other words, films composed of a single layer of nanoparticles will be uniformly one nanoparticle-diameter thick.

Additionally, there is increasing interest in utilizing nanoparticles composed of different materials as catalysts for growth of one dimensional (1-D) materials. This technique involves applying the (typically) metal catalysts to a surface, and then growing the 1-dimensional material using a technique such as chemical vapor deposition. The size of the catalyst will heavily influence the diameter of the resulting 1-D structure. In nearly all cases of growth of this type, the substrate (and catalyst) must be heated to high temperatures (over 400° C. and can be up to 1000° C.). However, at these high temperatures, nanoparticle-type catalysts distributed over a surface of a substrate will often aggregate, resulting in larger-sized catalysts with a broader size distribution (determined by metal diffusion during aggregation), and ultimately larger-diameter 1-D materials with a broader size distribution.

In spite of the intrinsic propensity of nanoparticles to self-organize and the potential advantages of nanoparticle films, there do not exist methods for uniformly depositing nanoparticle films over large areas, similar to conventional film deposition methods such as physical vapor deposition, sputtering, or chemical vapor deposition. Four methods for nanoparticle film deposition have been used to date:

1. Deposition from solution followed by solvent evaporation: In this method a solvent containing dissolved nanoparticles is deposited onto a substrate and the solvent is removed through controlled evaporation. As the solvent evaporates the nanoparticles organize themselves into crystalline layers. This method produces nicely-organized films, but the film thickness is uncontrolled. Layers of varying thickness forms as the solvent evaporates.

2. Nanoparticle film deposition by substrate immersion: In this method the substrate is immersed into a nanoparticle-containing solution and allowed to sit. Over time, nanoparticles diffuse in solution and find their way to the substrate. This method produces films of uniform thicknesses, however nanoparticle layers are not close-packed and often contain voids (regions devoid of nanoparticles). In addition, this method deposits nanoparticle layers everywhere on a surface.

Langmuir-Blodgett technique: In this method a nanoparticle film is formed on a liquid surface. By compressing the film on the liquid, the nanoparticles can be made to self organize. Films are transferred to a solid substrate by dip coating onto the liquid surface. This method produces ordered nanoparticle layers, however it is difficult to control film thickness. Often films are composed either of multilayers, or else contain voids. Also, cracks in the film can occur due to the stress of film transfer from liquid to solid substrate.

4. Nanoparticle film deposition by spin-casting: In this method nanoparticle-containing solutions are spin-coated onto a solid substrate. After solvent evaporation, a nanoparticle film remains. Nanoparticle films produced by this method are not well-organized, due to the non-equilibrium nature of the spin-casting process.

All of the above four methods describe depositing nanoparticle films over an entire surface of a substrate.

SUMMARY OF THE INVENTION

The invention is directed to a method of positioning nanoparticles on a patterned substrate. The method comprises providing a patterned substrate with selectively positioned recesses, and applying a solution or suspension of nanoparticles to the patterned substrate to form a wetted substrate. A wiper member is dragged across the surface of the wetted substrate to remove a portion of the applied nanoparticles from the wetted substrate. As a result, a substantial number of the remaining portion of the applied nanoparticles is disposed in the selectively positioned recesses of the substrate.

The invention is also directed to a method of making carbon nanotubes. The method comprises providing a patterned substrate with selectively positioned recesses, and applying a solution or suspension of nanoparticles to the patterned substrate to form a wetted substrate. A wiper member is dragged across a surface of the wetted substrate to remove a portion of the applied nanoparticles from the wetted substrate. As a result, a substantial number of the remaining portion of the applied nanoparticles is disposed in the selectively positioned recesses. The positioned nanoparticles form catalytic sites on the substrate from which carbon nanotubes can be formed under suitable heating and reaction conditions.

The invention is also directed to an array of nanoparticles positioned in recesses of a substrate. The nanoparticles will typically have a mean diameter of from 1 nm to 50 nm.

BRIEF DESCRIPTION OF THE DRAWINGS

These and other features of the present invention will become apparent upon consideration of the following detailed description of the invention when read in conjunction with the drawings, in which.

DETAILED DESCRIPTION OF THE INVENTION

Figure 1A:
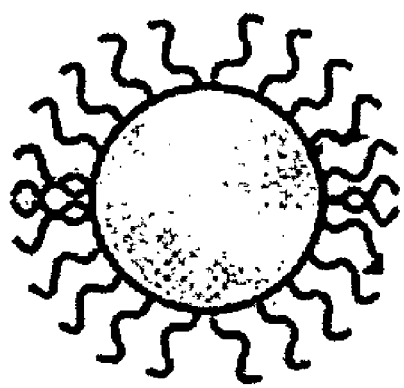
FIG. 1(a) is a pictorial depiction of a nanoparticle with adhered surfactant molecules.
Figure 1B:
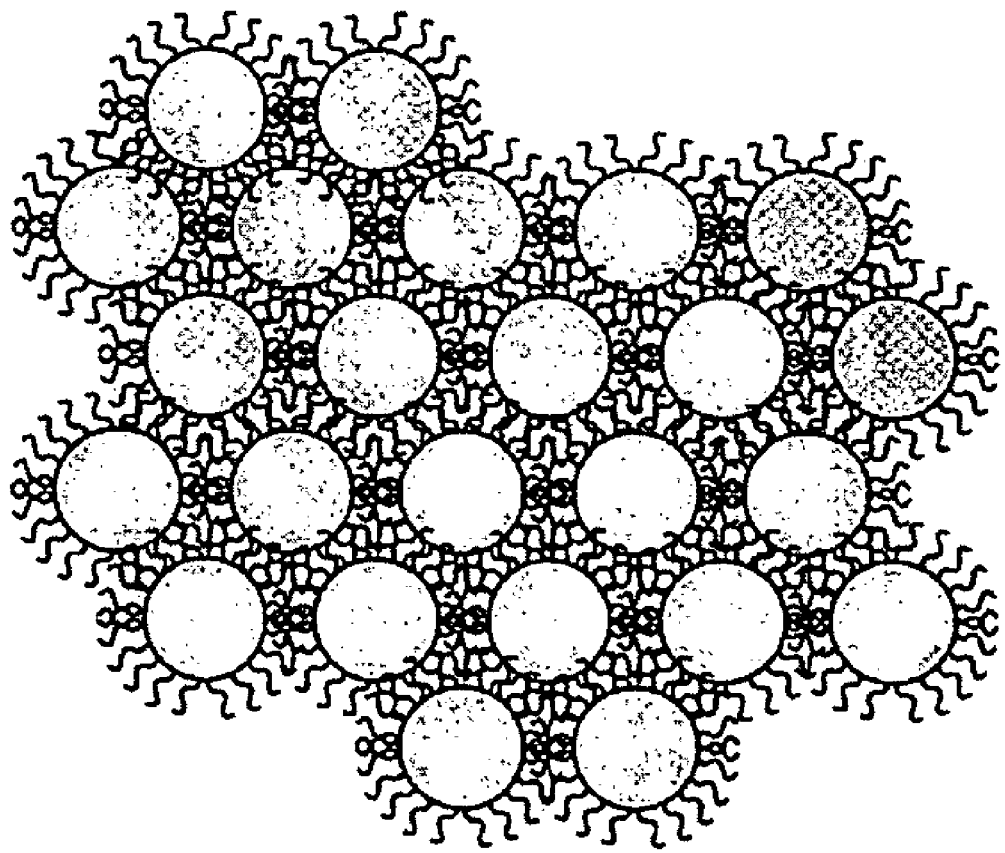
FIG. 1(b) is a pictorial depiction of self assembled nanoparticles.

The invention is directed to a method of positioning nanoparticles on a patterned substrate. The method comprises: providing a substrate with a pattern of recesses; applying a solution or suspension of nanoparticles to the patterned substrate to form a wetted substrate; and dragging a wiper member across a surface of the wetted substrate to remove a portion of the applied nanoparticles from the wetted substrate such that a substantial number of the remaining portion of the applied nanoparticles are disposed in the recesses.

The method can also include the additional steps of heating the wiped substrate with the remaining portion of the applied nanoparticles disposed in the selectively positioned recesses. The heating allows for the removal of organic material, e.g., organic surfactants or polar solvents, which can adhere to the nanoparticles. Alternatively, the method can also include contacting the wiped substrate with a wash solution followed by dragging the wiper member across the wash-contacted surface of the substrate. Following the wash step, the washed substrate can be heated to remove the organic material from the surface of the nanoparticle The method provides for the deposition of nanoparticles over selected areas of a substrate. Some of the advantages provided by the method include the following.

1. The method is relatively quick. The selective positioning of the nanoparticles over several square inches of substrate can take only a few seconds.

2. The selective positioning of the nanoparticles can be conducted in air, thus expensive vacuum systems are not necessarily required.

3. The thickness of resulting films that are formed from the positioned nanoparticles can be controlled by the average particle diameters of the nanoparticles. For example, a monolayer will predominately have a thickness of one diameter, whereas a bilayer will predominately have a thickness of two diameters.

4. The resulting action of the wiping member essentially removes nanoparticles from unwanted regions of the substrate such as a top surface, thus providing regions of the substrate free from nanoparticles.

5. The nanoparticle films can be aligned to other features on the substrate.

6. The method facilitates separation of nanoparticles on a substrate such that the subsequent heating of the substrate, e.g., for forming one-dimensional materials such as carbon nanotubes, will not cause the nanoparticles to aggregate. As a result, the formed materials will have a uniform linear dimension or diameter.

A schematic representation of one embodiment of the invention is depicted in FIG. 2. As shown, the initial step is to pattern a substrate with a plurality of recesses. Known lithographic techniques such as photolithography, imprint lithography, electron- or ion-beam lithography can be used to pattern the substrate. For example, a lithographic pattern can be transferred to a substrate using reactive-ion etching, chemical etching, ion-beam etching, or sputtering. The lithographic mask material is then removed leaving the substrate 10 with a pattern of recesses, FIG. 2(a) (a cross-section of a single recess 12 is shown). Non-lithographic techniques such as polymer self assembly (and optional etching step) or anodic etching of an aluminum film can also be used to provide a patterned mask through which to form recesses in the substrate.

Figure 2D:
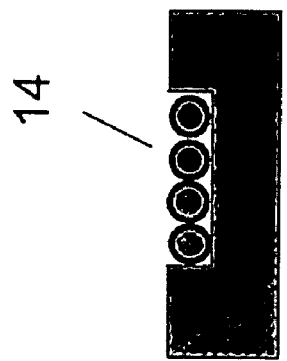
FIGS. 2(a) to 2(d) is a schematic representation of a process of the invention.
Figure 2C:
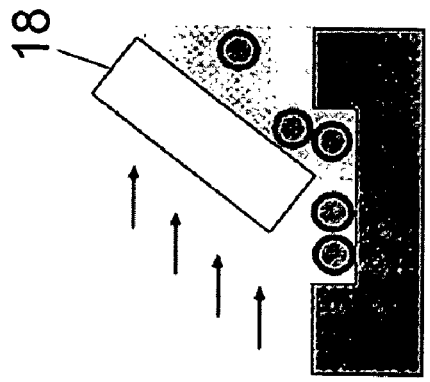
Figure 2B:
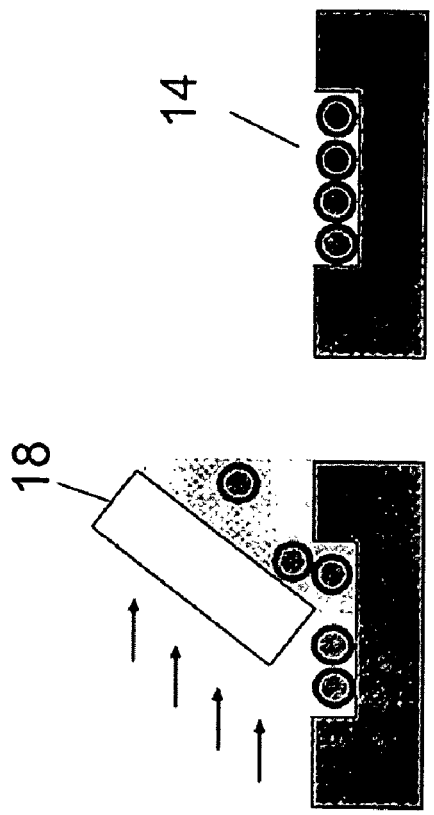

A suspension (slurry) or solution of nanoparticles 14 in a given solvent 16 is applied to the patterned substrate to form a wetted substrate, FIG. 2(b). Prior to evaporation of the solvent, a wiper member 18 is placed in contact with the wetted substrate and dragged across the surface, FIG. 2(c). The wiper member can be made of an elastomeric material. For example, the wiper member can contain polydimethylsiloxane (PDMS). Of course, other elastomeric materials with properties similar to PDMS can be used as well. The wiper member is essentially used as a "squeegee" to remove nanoparticles and excess solvent from the non-recessed areas of the substrate, and therefore, it is preferred that the wiper member include a uniform edge. The squeegee action also helps to direct nanoparticles into the recessed areas of the substrate. The action of wetting and dragging the wiper member across the surface of the patterned substrate can be repeated as many times is necessary to position the nanoparticles 14 in the recessed areas of the substrate, FIG. 2(d).

Following the positioning of the nanoparticles the substrate can be washed or rinsed with a wash solvent. Again, the wiper member can be used to remove the excess wash solvent.

Figure 2E:
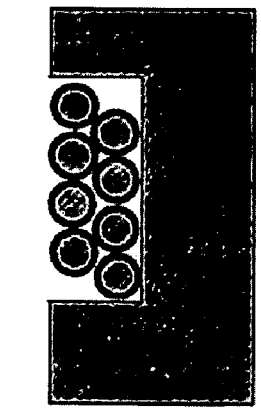
FIG. 2(e) is a pictorial depiction of a positioning of nanoparticles in a continuous channel.
Figure 2A:
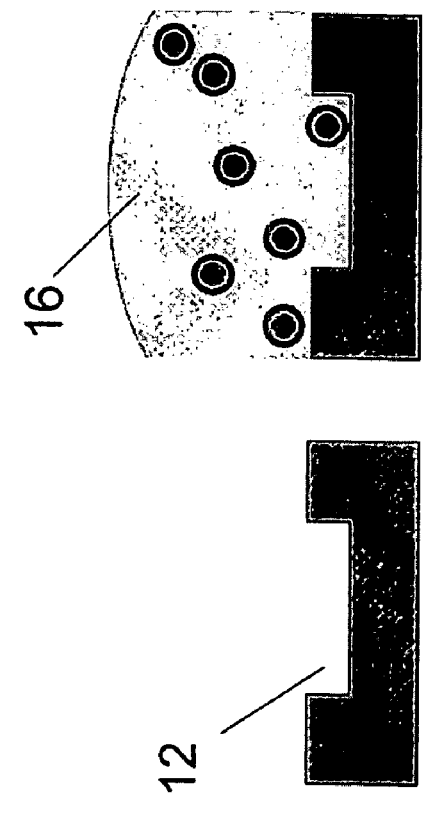
Figure 4A:
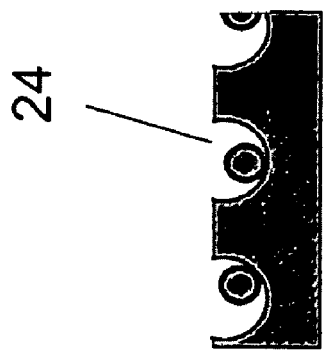
FIGS. 4(a) to 4(d) is a schematic representation of another process of the invention.
Figure 4B:
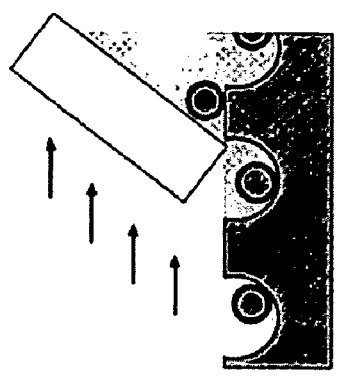
Figure 4C:
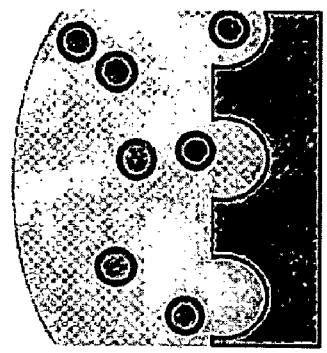
Figure 4D:
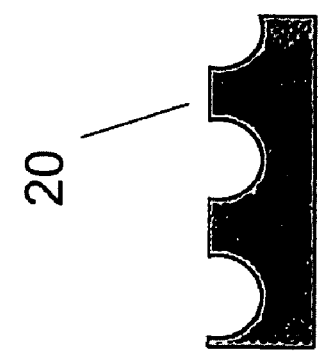

Following the positioning of the nanoparticles the substrate can be heated so as to remove organic material adhering to the surfaces of the positioned nanoparticles. The heating can also be used to sinter the positioned nanoparticles to form a continuous film within the recessed regions of the substrate. The top of the resulting film will be coplanar with the substrate surface, as the nanoparticle layer is recessed below the substrate surface (see, FIGS. 2(d) and 2(e)). As depicted in FIGS. 2(d) and 2(e), the thickness of the film can be controlled to some extent by the depth of the recess and the diameter of the nanoparticle. As a result, the process can provide greater control over thickness uniformity of the resulting films.

Figure 3:
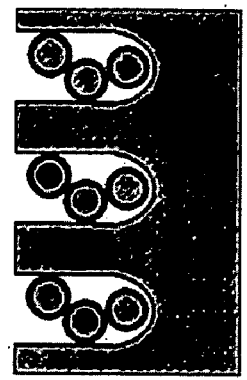
FIG. 3 is a pictorial depiction of a positioning of nanoparticles in a channel or hole with a width approximate to the diameter of the nanoparticles.

In another embodiment, the depth of the patterned recesses is taller than a single nanoparticle diameter, such that each recess accommodates more than a single layer of nanoparticles, see FIG. 2(e). If the diameter of the recessed area is between one and two nanoparticle diameters wide, then multilayers of single nanoparticles stacked on top of each other can be formed, see FIG. 3. The positioned nanoparticles can then be sintered to form continuous channels of selective material in the substrate, e.g., formation of copper wires (from Cu nanoparticles) in a dielectric substrate. The resulting copper wires will have diameters comparable to the diameters of the original nanoparticles.

The invention is also directed to an array of nanoparticles positioned in recesses of a substrate, wherein the nanoparticles have an average particle diameter of 1 nm to 50 nm. In one embodiment, the recess and the positioned nanoparticle have a comparable diameter such that the positioned nanoparticles are stacked within the recess. The array of nanoparticles can then be used as a template to form one-dimensional materials.

The positioning of nanoparticles on the substrate can also be used to seed the growth of one-dimensional materials such as nanowires or nanotubes. In one embodiment, the substrate 20 can be patterned such that individual recess volumes 22 are comparable to the particle size of the nanoparticles 24. If the average recess diameter is between one and two mean nanoparticle diameters wide, a single nanoparticle 24 will be positioned in each recess 22, FIG. 4(d). The same method described in relation to FIGS. 2(a) to 2(b) can be used to position the nanoparticles in each of the recess volumes as shown in FIG. 4.

Figure 5:
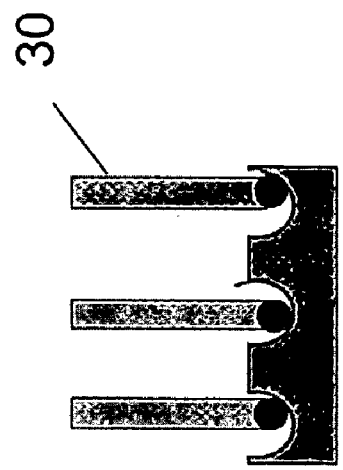
FIG. 5 is a pictorial depiction of a formed nanotube or nanowire.

Nanowires or nanotubes can be grown using known methods of chemical vapor deposition, FIG. 5. In this instance, the nanoparticles, typically, metal or metal oxide nanoparticles, are used to seed the growth of the nanotube/nanowire 30. In many cases, the mean diameter of the resulting one-dimensional materials can be controlled by the mean diameter of the nanoparticle. One example of a one-dimensional material that can be made by such a template synthesis are carbon nanotubes formed by chemical vapor deposition.

The invention is also directed to a method of making carbon nanotubes. The formed carbon nanotubes can have a mean diameter of from 1 nm to 50 nm, or from about 2 nm to about 10 nm. The method comprises providing a substrate with a pattern of recesses, and applying a solution or suspension of nanoparticles to the patterned substrate to form a wetted substrate. A wiper member is dragged across a surface of the wetted substrate to remove a portion of the applied nanoparticles from the wetted substrate such that a substantial number of the remaining portion of the applied nanoparticles are disposed in the recesses. Once the nanoparticles are positioned in the recesses, the heating of the wiped substrate under suitable reaction conditions provides the catalytic sites from which the carbon nanotubes form. In one embodiment, the nanoparticles comprise an iron oxide.

The carbon nanowires or carbon nanotubes are formed by any suitable growth technique known to those of ordinary skill. For example, the carbon materials can be grown by chemical vapor deposition (CVD) or plasma-enhanced chemical vapor deposition (PECVD) using any suitable gaseous or vaporized carbonaceous reactant(s) including, but not limited to, carbon monoxide, ethylene, methane, acetylene, a mixture of acetylene and ammonia, a mixture of acetylene and dinitrogen, a mixture of acetylene and dihydrogen, and xylene under growth conditions suitable for promoting carbon growth on the positioned nanoparticles. In such deposition processes, the substrate is typically heated to a temperature adequate to promote and/or hasten CVD growth. Additives may be mixed with the reactant to encourage the synthesis of single-wall nanotubes, the synthesis of multi-wall nanotubes, or to increase the nanotube lengthening rate or length.

The reactant chemically reacts with the nanoparticle to nucleate the carbon materials and to sustain their growth following nucleation. One such carbon material that can be grown are carbon nanotubes. Carbon nanotubes are typically described as hollow cylindrical tubes composed of precisely arranged hexagonal rings of bonded carbon atoms. The carbon nanotubes may be multi-wall nanotubes resembling concentric cylinders or may be single-wall nanotubes. The carbon nanotubes will generally extend from the positioned nanoparticle(s) in a direction generally perpendicular to or in an approximately perpendicular orientation to the horizontal surface of the substrate. The carbon nanotubes are expected to have a statistical distribution of heights or lengths.

In one embodiment, single-wall nanotubes can be grown from the positioned nanoparticle(s) as described in U.S. patent application Ser. No. 10/689,675, filed Oct. 22, 2003 and assigned to International Business Machines Corporation, the entire disclosure of which is incorporated herein by reference. This patent application describes how one of ordinary skill can control the diameter of CVD or PECVD grown carbon nanotubes based on the control of the residence time of the gases in the reactor such as by controlling the pressure, or the gas flow rates, or a combination of both. As defined by Grill in "Cold Plasma in Materials Fabrication From Fundamentals to Applications" published by IEEE press, 1994, page 91, the gas residence time is: $t_r = p \, vol_r/Q$; wherein p=pressure (atmospheres), $vol_r$=volume of reactor ($cm^3$) and Q=total mass flow (sccm). The gas residence time is a measure of the average time of the gas in the reactor. Thus, if the flow is constant and the pressure increases, the residence time increases, and if the pressure is constant and the flow increases the residence time decreases. The residence time is typically about 1 minute to about 20 minutes and more typically about 1 to about 10 minutes. The residence time is typically determined by controlling the pressure, flow or both the pressure and flow in the reactor. By varying the residence time (e.g growth pressure and/or flow rates) of the precursor gases in the CVD or PECVD reactor, carbon nanotubes with diameters from about 0.2 nanometers to several nanometers can be formed.

In the process of the invention, any known substrate material can be used including silicon, silicon dioxide, silicon nitride, and metals such as aluminum, tungsten, copper, gold, or platinum.

Figure 6:
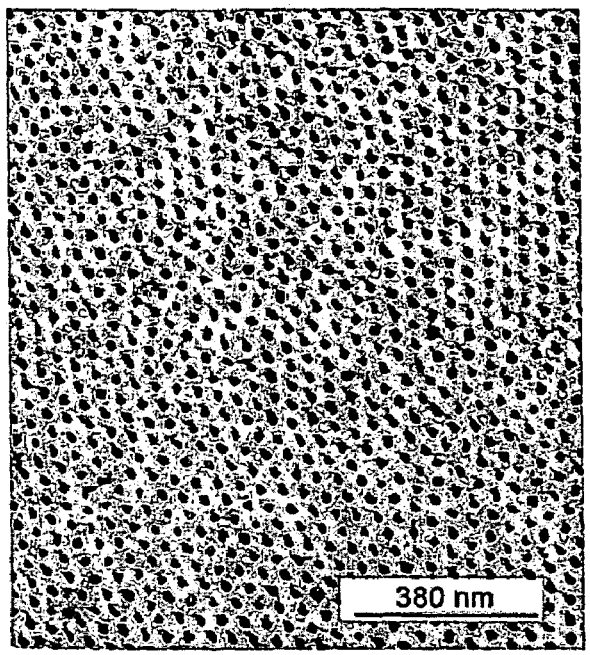
FIG. 6 is a scanning electron micrograph (SEM) of a self assembled, porous polystyrene film on a silicon dioxide surface.

In one embodiment, a porous polymer film was formed on a thin layer (40 nm) of silicon dioxide that had been grown by thermal oxidation on a silicon substrate. The porous polymer film was then patterned using a diblock copolymer patterning technique similar to that described in the literature (see, for example, K. W. Guarini et al., Advanced Materials, 14 1290 (2002), or T. Thurn-Albrecht et al., Advanced Materials, 12, 787 (2000), or references contained therein). For instance, a random copolymer brush layer was formed on the silicon dioxide film (substrate) by spin-casting from a dilute solution, followed by thermal annealing, and a subsequent solvent rinse. A diblock copolymer film comprising polystyrene (PS) and polymethylmethacrylate (PMMA) of appropriate thickness was applied to this surface by spin-casting, and it was allowed to self assemble by thermal annealing. After annealing, the polymer-coated substrate was exposed to ultraviolet light (this step is optional) and immersed in acetic acid, followed by a water rinse and dried in nitrogen. The resulting film comprised a porous polystyrene material with pores hexagonally arranged on the surface. The pore size and spacing depend on the molecular weight of the diblock copolymer. In this embodiment, for example, the pore size was about 20 nm in diameter with about a 40 nm pore center to center distance. FIG. 6 is a scanning electron microscope (SEM) image of the resulting porous PS film.

Figure 7:
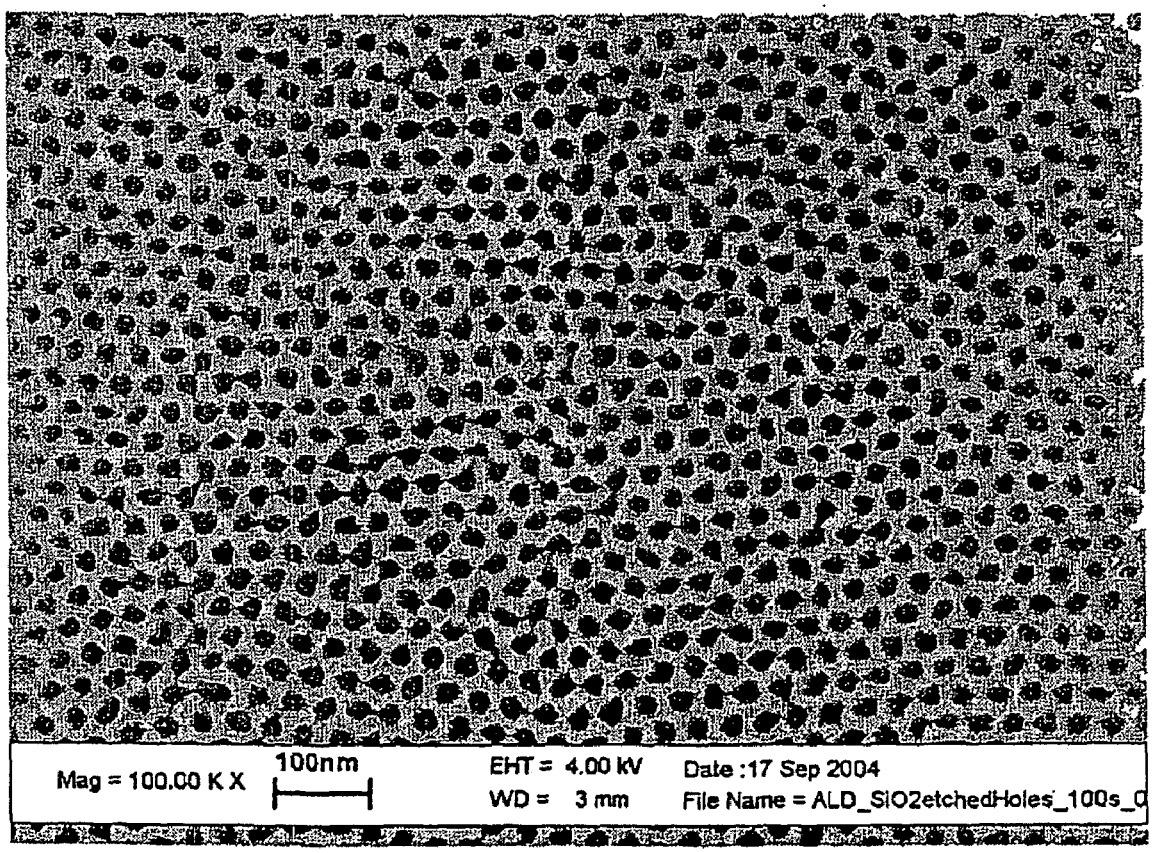
FIG. 7 is a SEM of the transferred pattern of FIG. 6 into a silicon dioxide surface.

The porous PS pattern was then transferred to the underlying silicon dioxide film using plasma etching. Other possible techniques one can use include wet chemical etching, ion beam etching, or physical sputtering. After plasma etching, the PS film was removed using an oxygen plasma. One can also use organic solvent, acids, or ozone to remove the PS. An SEM image of the resulting porous oxide film is shown in FIG. 7. The depth of the pores can be controlled by the plasma etch time, while the pore diameter and spacing are dictated by the formed PS film depending on the application of the patterned substrate. In this embodiment, for example, the oxide pore diameters were about 20 nm with spacings of about 40 nm, and pore depths were from 10 nm to 40 nm.

Figure 8A:
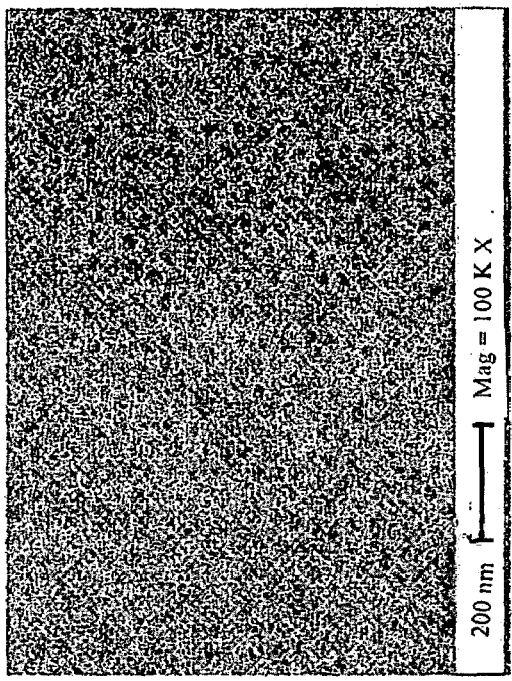
FIGS. 8(a) and 8(b) is a SEM of the transferred pattern of FIG. 7 and the transferred pore size reduced by atomic layer deposition, respectively.
Figure 8B:
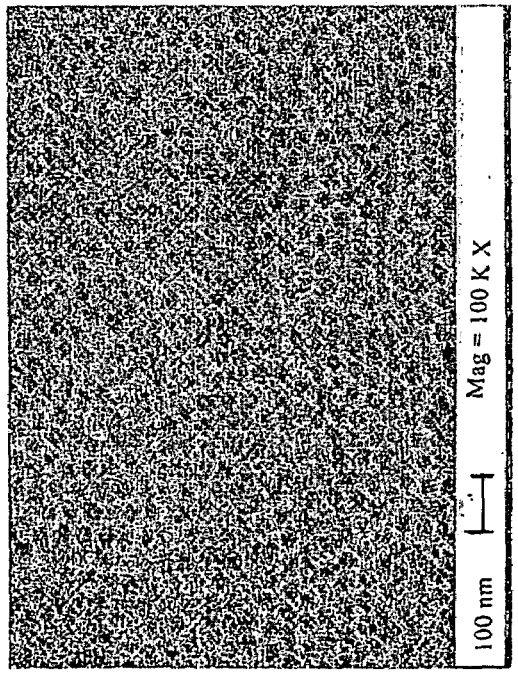

The resulting pore size can be further adjusted by one or more chemical techniques. For example, one can use a conformal film deposition (such as atomic layer deposition, chemical vapor deposition, or sputtering) onto the porous oxide surface. For instance, we were able to decrease the pore diameters with atomic layer deposition of tantalum nitride onto the oxide surface as shown in FIGS. 8(a) and 8(b). In this case, the pore diameter was reduced by about 45% to about 14 nm (starting from about 26 nm). The chemical techniques that are used to shrink pore mean pore diameters can reduce the mean pore diameter to about 10 nm, or as small as about 5 nm. Note that this technique does not change the pore spacing, but only the pore diameter.

Figure 9A:
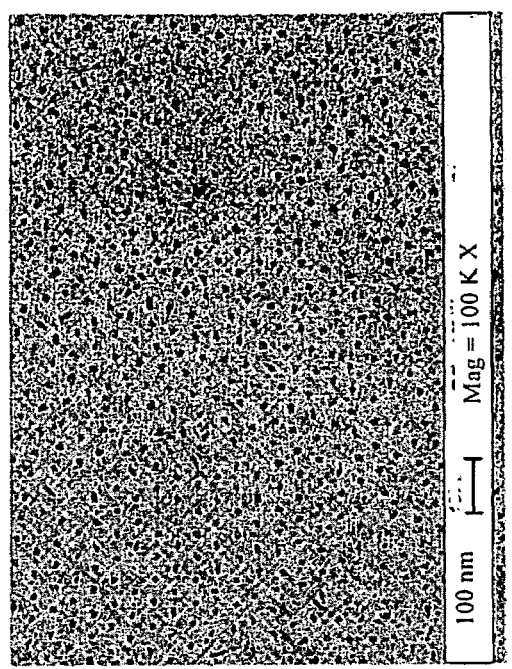
FIG. 9(a) is a SEM of the transferred pattern into a silicon substrate.
Figure 9B:
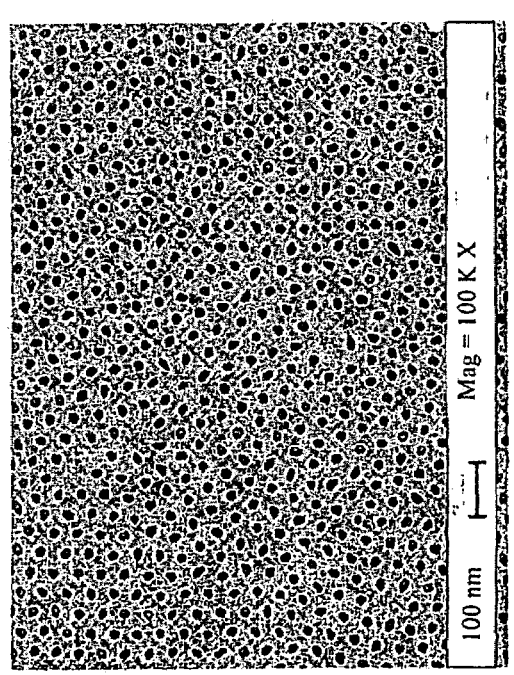
FIG. 9(b) is a SEM of the transferred pattern of FIG. 9(a) reduced by thermal oxidation.

Alternatively, if the substrate had been silicon rather than silicon dioxide, one could use thermal oxidation as a method for shrinking pore size. Oxidation of a porous silicon surface reduces the pore dimensions because oxide occupies roughly twice the volume of silicon. The results of such a process is shown in FIGS. 9(a) and 9(b).

A solution of nanoparticles with a mean diameter of 14 nm in octane solvent was applied to the porous substrate shown in FIG. 7. The concentration of the nanoparticles in the solvent was less than 1% by weight. The substrate surface is then wetted with the suspension (nanoparticle containing solution) by completely covering the substrate with the suspension. This is accomplished by depositing the suspension with a pipette, or alternatively the substrate can be immersed in the nanoparticle suspension.

The nanoparticles used in the process of the invention are generally monodisperse in diameter and, on many occasions, have a mean diameter not too different from the mean pore diameter of the porous surface. Typical mean nanoparticle diameter is from about 1 nm to 20 nm with a standard deviation of less than about 15% of the mean diameter. Optimally, the mean nanoparticle diameter distributions are less than 5% of the mean diameter. The nanoparticles can be dispersed in an organic solvent such as hexane, oxtane, decane, or dodecane, or mixtures thereof.

While the substrate was still wet with the nanoparticle containing solution, an elastomeric wiper (squeegee) was placed in contact with the substrate and wiped across the surface. The wiping action of the squeegee removed excess nanoparticle containing liquid from the substrate. It may be advantageous to pre-wet the wiper with a clean solvent (hexane, octane, etc). Also, the wiper can be moved across the surface any number of times.

Figure 10:
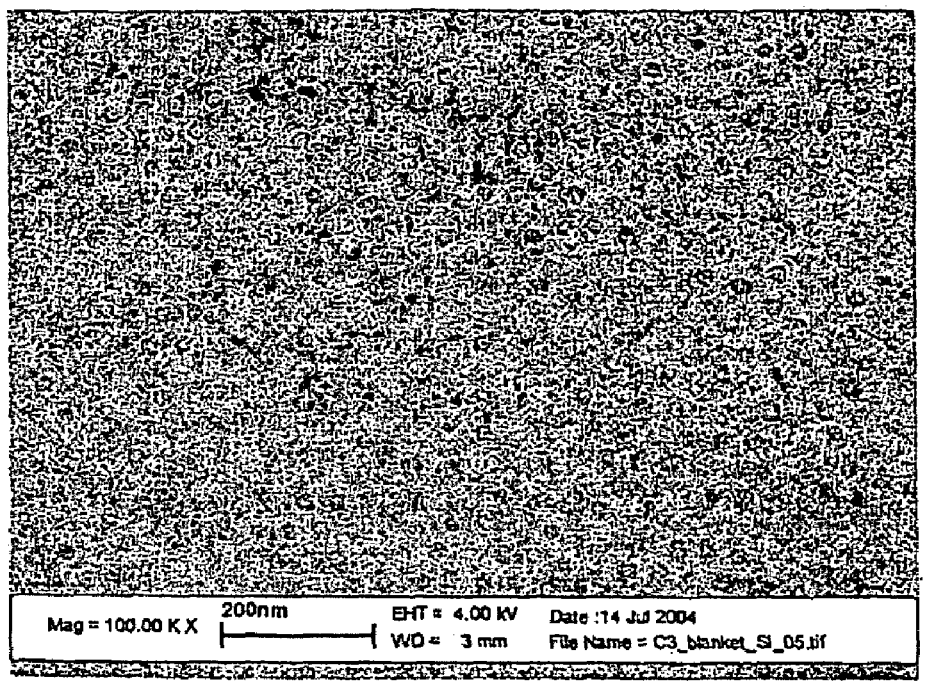
FIG. 10 is a SEM of FIG. 7 with the positioned nanoparticles following action of the wiper member according to the process of the invention.

If the mean nanoparticle diameter is roughly matched in size with the pores of the substrate surface, then single nanoparticles will be deposited in a majority of the pores on the surface. FIG. 10 shows a scanning electron microscope image of one such porous surface, where over 90% of the pores have been filled with a single nanoparticle. In this case, the nanoparticles are comprised of iron oxide, and have mean diameters of 14 nm.

Figure 11A:
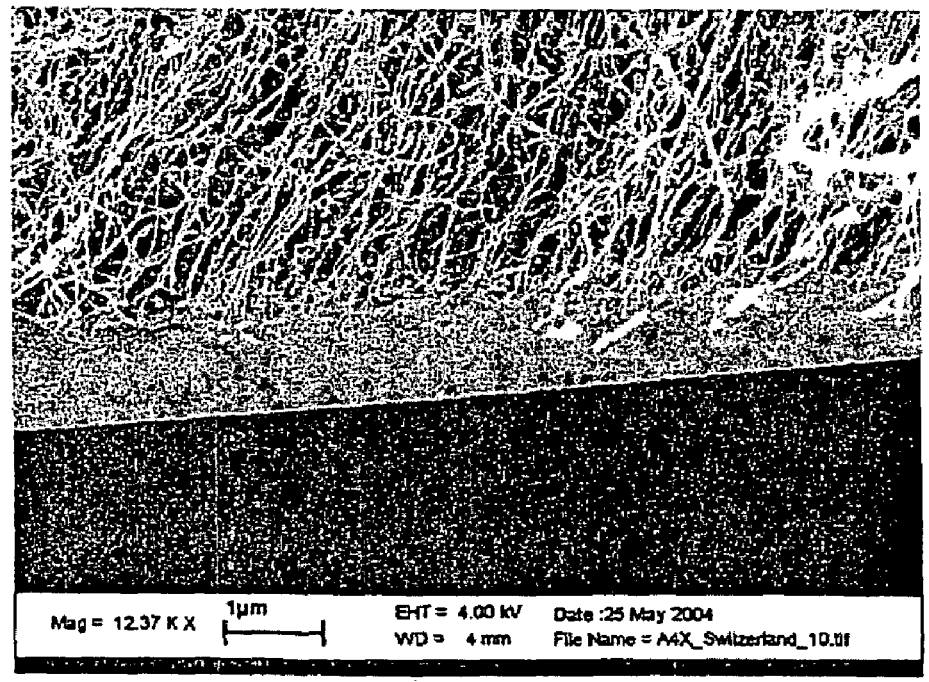
FIGS. 11(a) and 11(b) are SEMs of carbon nanotubes formed by the process of the invention.
Figure 11B:
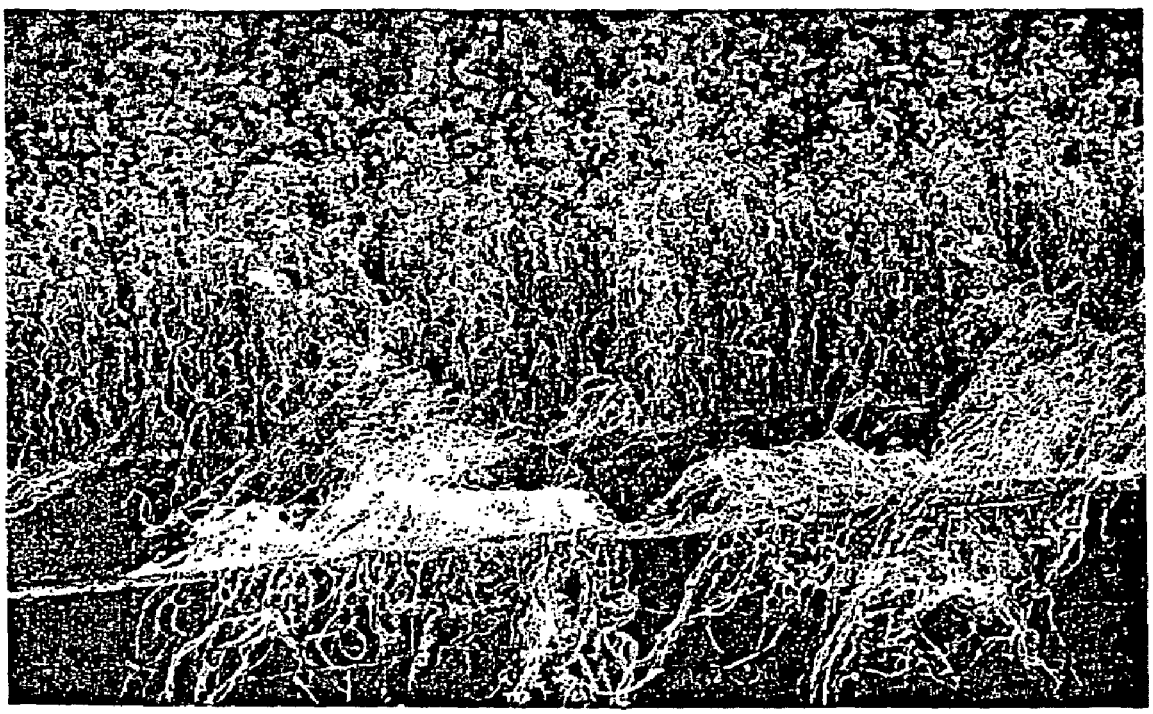

Following placement of the single nanoparticles in a majority of the pores of the substrate, the nanoparticles were used as catalytic sites for carbon nanotube growth. One advantage of this technique is that the nanoparticles are physically confined to the substrate pores and are thus prevented from aggregating during the high temperature nanotube growth process. For example, placement of the pore filled substrate in a tube furnace resulted in the formation of carbon nanotubes using chemical vapor deposition. The tube furnace was heated to a temperature of 800° C. while flowing hydrocarbon-containing gas. FIGS. 11(a) and 11(b) show the resulting multiwall carbon nanotubes grown from individual catalysts placed on the substrate.

We claim:

1. A method of positioning nanoparticles on a patterned substrate, the method comprising:
   providing a patterned substrate with selectively positioned recesses;
   applying a solution or suspension of nanoparticles to the patterned substrate to form a wetted substrate;
   dragging a wiper member across a surface of the wetted substrate to remove a portion of the applied nanoparticles from the wetted substrate such that a substantial number of the remaining portion of the applied nanoparticles are disposed in the selectively positioned recesses;
   heating the wiped substrate with the remaining portion of the applied nanoparticles disposed in the selectively positioned recesses;
   wherein the nanoparticles are catalytic sites for the growth of one-dimensional materials.

2. The method of claim 1 wherein the nanoparticles are of substantially uniform mean diameter from about 2 nm to 50 nm.

3. The method of claim 2 wherein the nanoparticles have a mean diameter from about 1 nm to about 10 nm.

4. The method of claim 1, wherein the mean diameter of the positioned recesses is between one and two times the mean diameter of the nanoparticles.

5. The method of claim 1 further comprising contacting the wiped substrate with a wash solution followed by dragging the wiper member across the wash-contacted surface, of the substrate, and heating the washed substrate with the remaining portion of the applied nanoparticles disposed in the selectively positioned recesses.

6. The method of claim 1 wherein the wiper member is an elastomeric member with a uniform edge.

7. The method of claim 4 wherein the wiper member comprises polydimethylsiloxane.

8. A method of making carbon nanotubes comprising:
providing a patterned substrate with selectively positioned recesses;
applying a solution or suspension of nanoparticles to the patterned substrate to form a wetted substrate;
dragging a wiper member across a surface of the wetted substrate to remove a portion of the applied nanoparticles from the wetted substrate such that a substantial number of the remaining portion of the applied nanoparticles are disposed in the selectively positioned recesses;
heating the wiped substrate with the remaining portion of the applied nanoparticles disposed in the selectively positioned recesses to form catalytic sites on the heated substrate; and
forming the carbon nanotubes from the catalytic sites.

9. The method of claim 8 wherein the nanoparticles comprise an iron oxide.

10. The method of claim 8 further comprising contacting the wiped substrate with a wash solution followed by dragging the wiper member across the wash-contacted surface of the substrate.

11. The method of claim 8 wherein the formed carbon nanotubes have a mean diameter of from 10 nm to 50 nm.

12. The method of claim 8 wherein the nanoparticles have a mean diameter of from 1 nm to 50 nm.

* * * * *